(12) United States Patent
Chesneau et al.

(10) Patent No.: US 10,644,597 B2
(45) Date of Patent: May 5, 2020

(54) SMPS AND CONTROL PROCESS OF A SMPS

(71) Applicant: STMicroelectronics (Grenoble 2) SAS, Grenoble (FR)

(72) Inventors: David Chesneau, Renage (FR); Francois Amiard, Proveysieux (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 0 days.

(21) Appl. No.: 16/222,366

(22) Filed: Dec. 17, 2018

(65) Prior Publication Data

US 2019/0190381 A1 Jun. 20, 2019

(30) Foreign Application Priority Data

Dec. 18, 2017 (FR) ...................................... 17 62374

(51) Int. Cl.
*H02M 3/155* (2006.01)
*H02M 3/156* (2006.01)
(Continued)

(52) U.S. Cl.
CPC ............. *H02M 3/158* (2013.01); *H02M 1/08* (2013.01); *H02M 3/155* (2013.01); *H02M 2003/1555* (2013.01)

(58) Field of Classification Search
CPC ...... H02M 3/155; H02M 3/156; H02M 3/158; H02M 3/1563; H02M 2003/1566
See application file for complete search history.

(56) References Cited

U.S. PATENT DOCUMENTS 8,253,407 B2 * 8/2012 Chen .................... H02M 3/1588
323/284
10,218,254 B1 * 2/2019 Neyra ..................... H02M 1/08
(Continued)

FOREIGN PATENT DOCUMENTS

EP 0849753 A2 6/1998
JP 2010259222 A 11/2010

OTHER PUBLICATIONS

Labbe, B. et al., "An Integrated Sliding-Mode Buck Converter With Switching Frequency Control for Battery-Powered Applications", IEEE Transactions on Power Electronics, vol. 28, No. 9, Sep. 2013, 9 pages.

*Primary Examiner* — Jeffrey A Gblende
*Assistant Examiner* — Sisay G Tiku
(74) *Attorney, Agent, or Firm* — Slater Matsil, LLP

(57) ABSTRACT

A method includes switching a switching circuit of the switched-mode power supply in a synchronous mode by turning on and off switches of the switching circuit in synchrony with a clock signal, wherein the switching circuit is coupled to an inductive element, and wherein the synchronous mode comprises a charging phase and a discharging phase; switching the switching circuit in an asynchronous mode by turning on and off switches of the switching circuit without being synchronized with the clock signal, wherein the asynchronous mode comprises a charging phase and a discharging phase; charging the inductive element during the charging phase of the synchronous mode; discharging the inductive element during the discharging phase of the synchronous mode; charging the inductive element during the charging phase of the asynchronous mode; and discharging the inductive element during the discharging phase of the asynchronous mode.

22 Claims, 5 Drawing Sheets

(51) Int. Cl.
*H02M 3/158* (2006.01)
*H02M 1/08* (2006.01)

(56) References Cited

U.S. PATENT DOCUMENTS

| | | | |
|---|---|---|---|
| 2001/0035745 A1 | 11/2001 | Muratov et al. | |
| 2006/0152205 A1* | 7/2006 | Tang | H02M 3/1584 323/284 |
| 2009/0040791 A1* | 2/2009 | Qahouq | H02M 3/1588 363/21.01 |
| 2009/0309561 A1 | 12/2009 | Chen et al. | |
| 2012/0049824 A1 | 3/2012 | Chen et al. | |
| 2012/0212193 A1 | 8/2012 | Sreenivas et al. | |
| 2014/0070784 A1* | 3/2014 | Lynch | H02M 3/156 323/283 |
| 2014/0253086 A1* | 9/2014 | Rosu-Hamzescu | H03K 17/0822 323/311 |
| 2014/0266122 A1* | 9/2014 | Zhu | H02M 3/156 323/284 |
| 2015/0155784 A1* | 6/2015 | Ouyang | H02M 3/1563 323/285 |
| 2015/0326120 A1* | 11/2015 | Kelin | H02M 3/158 323/282 |
| 2016/0352227 A1* | 12/2016 | Houston | H02M 3/158 |
| 2018/0013348 A1* | 1/2018 | Paul | H02M 3/1584 |
| 2018/0041123 A1* | 2/2018 | Matsushima | H02M 1/08 |
| 2018/0152099 A1* | 5/2018 | Savic | H02M 3/156 |

* cited by examiner

SMPS AND CONTROL PROCESS OF A SMPS

CROSS-REFERENCE TO RELATED APPLICATIONS

This application claims the priority benefit of French patent application number 17/62374, filed on Dec. 18, 2017, the content of which is hereby incorporated by reference in its entirety to the maximum extent allowable by law.

TECHNICAL FIELD

The present disclosure relates generally to an electronic system and method, and, in particular embodiments, to a switched-mode power supply (SMPS) and control process of an SMPS.

BACKGROUND

In a switched-mode power supply (SMPS), a DC voltage is chopped by switching switches to implement phases of power storage and discharge in an inductive element. The power stored in the inductive element is transferred to a load connected to the switched-mode power supply.

SUMMARY

Some embodiments relate to DC/DC power converters, of the SMPS type, which convert a DC voltage into another DC voltage. Some embodiments relate to step-down (buck) converters.

One or more embodiments provide a method of controlling a switched-mode power supply.

Some embodiment provide a method of controlling a switched-mode power supply comprising first phases of power storage in an inductive element synchronized with a clock signal, and second phases of power storage in the inductive element which are not synchronized with the clock signal. In some embodiments, the clock signal has a fixed frequency.

According to an embodiment, the first phases belong to a synchronous control mode, and the second phases belong to an asynchronous control mode.

According to an embodiment, a switching from one mode to the other is caused by the detection of a transient phenomenon.

According to an embodiment, the switching is further conditioned by a signal representative of a current flowing through the inductive element.

According to an embodiment, a switching from the asynchronous control mode to the synchronous control mode is caused by a decrease of an output voltage with respect to a reference voltage.

According to an embodiment, the decrease is detected by a comparison with a first threshold of a signal representative of a difference between the output voltage and the reference voltage, preferably obtained by using a circuit implementing a proportional-integral-derivative function.

According to an embodiment, the asynchronous control mode further comprises, after each second phase, a third phase of discharge of the power stored in the inductive element.

According to an embodiment, the decrease is detected during the third phase.

According to an embodiment, a switching from the synchronous control mode to the asynchronous control mode is caused by an increase of an output voltage with respect to a reference voltage.

According to an embodiment, the increase is detected by a comparison with a second threshold of a signal representative of a difference between the output voltage and the reference voltage, preferably obtained by using a circuit implementing a proportional-integral-derivative function.

According to an embodiment, the synchronous control mode further comprises, after each first phase, a fourth phase of discharge of the power stored in the inductive element.

According to an embodiment, the increase is detected during the fourth phase.

Another embodiment provides a switched-mode power supply capable of implementing the above method.

According to an embodiment, the switched-mode power supply comprises an inductive element, a switching circuit coupled to a terminal of the inductive element, and a circuit for controlling the switching circuit.

According to an embodiment, the control circuit comprises an asynchronous state machine configured to supply control signals to the switching circuit.

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
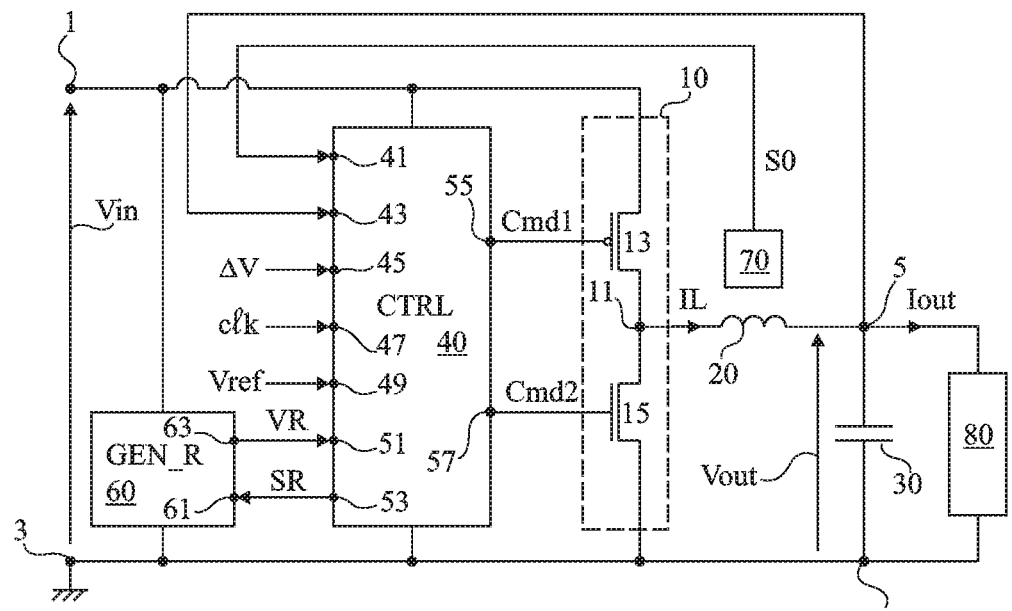
FIG. 1 schematically illustrates an embodiment of a switched-mode power supply.

The same elements have been designated with the same reference numerals in the various drawings and, further, the various drawings are not to scale. For clarity, only those steps and elements which are useful to the understanding of the described embodiments have been shown and are detailed.

In the following description, unless otherwise specified, the expressions "approximately," "substantially," and "in the order of" mean to within 10%, preferably to within 5%.

Unless otherwise specified, when reference is made to two elements connected together, this means that the elements are directly connected with no intermediate element other than conductors, and when reference is made to two elements coupled together, this means that the two elements may be directly coupled (connected) or coupled via one or a plurality of other elements.

In an embodiment, a controller (or control circuit) controls a switched-mode power supply by alternating between a synchronous control mode and an asynchronous control mode. In particular embodiments, the controller causes the switched-more power supply to switch from the asynchronous control mode to the synchronous control mode on detection of a first transient phenomenon corresponding to a decrease in the output voltage of the power supply, which may be due to an increase in the current drawn by the power supply load. Conversely, the controller causes the switched-mode power supply to switch from the synchronous mode to the asynchronous mode on detection of a second transient phenomenon corresponding to an increase in the output voltage of the power supply, which may be due to a decrease in the current drawn by the load.

In an embodiment, a switched-mode power supply monitors load transients, and transitions from the asynchronous mode to the synchronous mode when the load transient is larger than a threshold. In some embodiments, the switched-mode power supply is a DC-DC buck converter. In some embodiments, the buck converter has a maximum output current that is about three times larger than the inductor current ripple (other values for the maximum output current of the buck converter may be used). In some embodiments, the switched-mode power supply operates with fixed frequency when operating in the synchronous mode.

FIG. 1 schematically shows an embodiment of a switched-mode power supply.

The switched-mode power supply (a buck converter in this example) comprises two input terminals 1 and 3 intended to receive a DC power supply voltage Vin and two output terminals 5 and 7 intended to supply a DC output voltage Vout. Voltage Vin is for example positive and referenced to terminal 3, typically, the ground. Voltage Vout is for example positive and referenced to terminal 7, terminal 7 here being connected to terminal 3.

A switching circuit 10 (in dotted lines in FIG. 1) is connected between terminals 1 and 3. Circuit 10 comprises an output terminal 11. Circuit 10 is configured to selectively couple terminal 11 to terminal 1, to terminal 3, or to none of the two terminals. Circuit 10 for example comprises two switches 13 and 15 series-connected between terminals 1 and 3. In this example, switch 13 is a MOS transistor having its source and its drain respectively connected to terminals 1 and 11, and switch 15 is a MOS transistor having its drain and its source respectively connected to terminals 3 and 11.

An inductive element 20 couples terminal 11 of circuit 10 to terminal 5 of the switched-mode power supply. Further, in this example, a capacitive element 30, for example, a capacitor, couples output terminal 5 to terminal 7.

The switched-mode power supply comprises a control circuit 40 (CTRL), for example, powered with voltage Vin. Circuit 40 comprises input terminals 41, 43, 45, 47, 49, and 51 and output terminals 53, 55, and 57. Terminal 41 is intended to receive a signal S0 representative of current IL flowing through inductive element 20. Signal S0 is supplied by a sensor 70, such as a current sensor, associated with inductive element 20. Terminal 43 is coupled to output terminal 5 of the switched-mode power supply. Terminal 45 is intended to receive a signal $\Delta V$ representative of a hysteresis to be applied to a reference voltage. Input terminal 47 is intended to receive a periodic binary signal or clock signal clk. In some embodiments, clock signal clk has a fixed frequency.

Terminal 49 is intended to receive a signal Vref representative of a reference voltage. A voltage ramp VR, for example referenced to terminal 3, is intended to be applied to terminal 51, and originates from an output terminal 63 of a voltage ramp generator 60. Output terminal 53 supplies a control signal SR to an input terminal 61 of ramp generator 60. Terminals 55 and 57 supply control signals Cmd1 and Cmd2 to transistors 13 and 15 of switching circuit 10. As an example, signals Cmd1 and Cmd2 are binary signals. For example, the high or low state of signal Cmd1 controls the off or on state of switch 13, and the high or low state of signal Cmd2 controls the off or on state of switch 15. In the shown example, terminals 55 and 57 are connected to the gates of respective transistors 13 and 15.

Ramp generator 60 (GEN_R) is for example powered with voltage Vin. As an example, signal SR is a binary signal and generator 60 supplies rising voltage ramps VR, each ramp starting as signal SR switches from a first binary state to a second binary state (e.g., low to high) and ending at the next switching of signal SR from the second binary state to the first binary state (e.g., high to low), voltage VR being equal to zero between two successive ramps and being capable of reaching the value of voltage Vin during a ramp. Other ramp voltages are also possible.

In operation, signals $\Delta V$, clk, and Vref are supplied to control circuit 40, and a load 80 is connected to output terminal 5, for example, between terminals 5 and 7. A current Iout flows through load 80. As an example, signal $\Delta V$ is a hysteresis voltage, for example, referenced to terminal 3, positive, and smaller than voltage Vin. Signal Vref is, for example, a DC reference voltage, for example, referenced to terminal 3, positive, and smaller than power supply voltage Vin. According to the values of voltages Vout, Vref, $\Delta V$, and VR and of signals So and clk available on its input terminals, control circuit 40 generates control signals Cmd1, Cmd2 and SR to maintain, across the assembly of load 80 and of capacitive element 30, a DC output voltage Vout substantially equal to reference voltage Vref, which, as it can be seen in FIGS. 4 and 5 described hereafter, has a value substantially constant and representative of the target value for the output voltage Vout. In particular embodiments, when switches 13 and 15 are respectively on and off, during a phase of power storage in inductive element 20, current IL increases as power is being stored. Conversely, when switches 13 and 15 are respectively off and on, during a phase when all or part of the power stored in inductive element 20 is discharged, current IL decreases as inductive element 20 discharges the power. Further, if current IL is greater than current Iout, capacitive element 30 charges, which causes an increase in voltage Vout, and if current IL is smaller than current Iout, capacitive element 30 discharges, which causes a decrease in voltage Vout.

Figure 2:
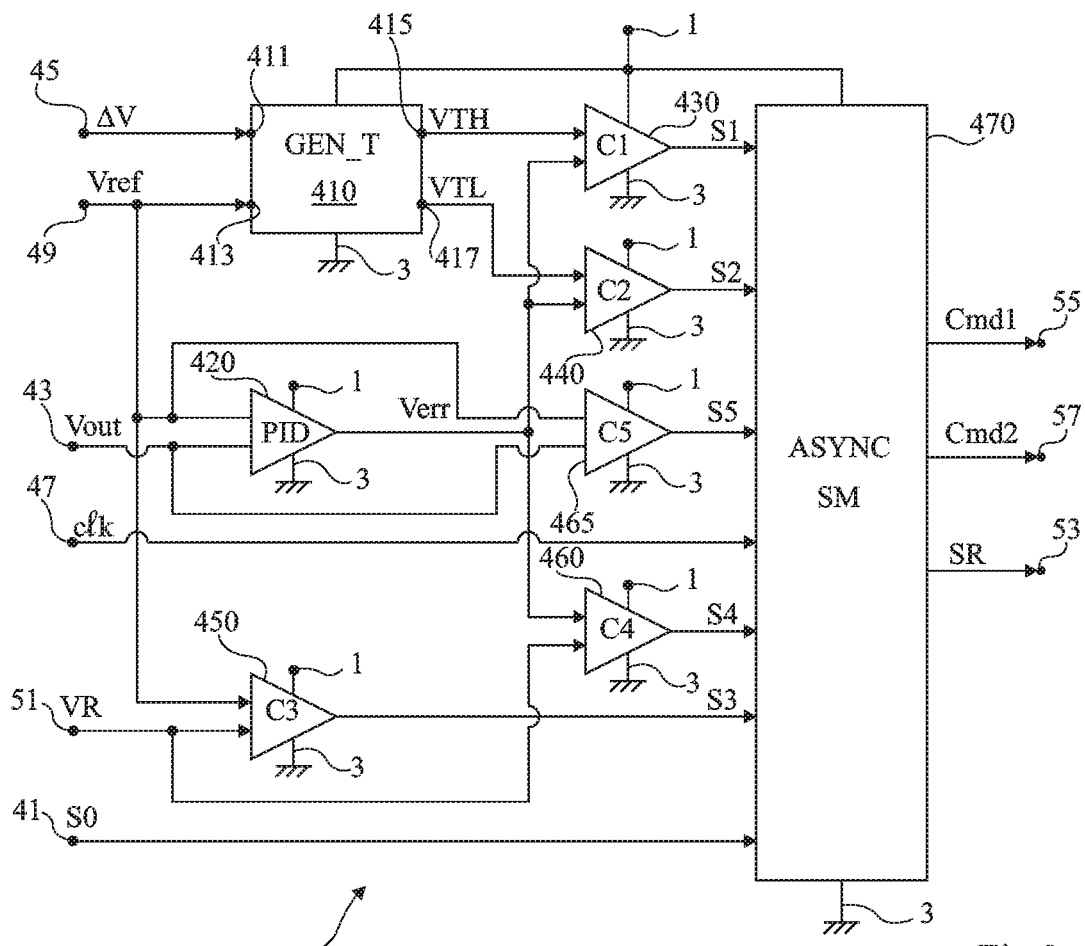
FIG. 2 schematically illustrates an embodiment of a circuit for controlling the switched-mode power supply of FIG. 1.

FIG. 2 schematically shows an embodiment of control circuit 40 of FIG. 1.

Circuit 40 comprises a threshold generation circuit 410 (GEN_T), for example, powered with voltage Vin. Circuit 410 comprises an input terminal 411 connected to terminal 45 of circuit 40, and an input terminal 412 connected to terminal 49 of circuit 40. Circuit 410 further comprises an output terminal 415 supplying a first threshold VTH and an output terminal 417 supplying a second threshold VTL. Each of thresholds VTH and VTL is representative of a given difference between output voltage Vout and reference voltage Vref. As an example, circuit 410 supplies a threshold voltage VTH, for example, referenced to terminal 3 and equal to Vref+$\Delta V$, and a threshold voltage VTL, for example referenced to terminal 3 and equal to Vref−$\Delta V$.

Control circuit 40 further comprises a circuit or amplifier 420 (PID) implementing a proportional-integral-derivative function, and comparators 430 (C1), 440 (C2), 450 (C3), 460 (C4), and 465 (C5), the amplifier and each of the comparators being, for example, powered with voltage Vin.

Amplifier 420 comprises one output terminal and two input terminals respectively connected to terminals 43 and 49 of circuit 40. Amplifier 420 is configured to supply, at its output terminal, a voltage Verr representative of the difference between voltages Vout and Vref. In this embodiment, voltage Verr is for example equal to voltage Vref when voltages Vref and Vout are equal, greater than voltage Vref when voltage Vout is smaller than voltage Vref, and smaller than voltage Vref when voltage Vout is greater than voltage Vref.

Comparator 430 comprises one output terminal and two input terminals respectively connected to the output terminal of amplifier 420 and to output terminal 415 of circuit 410. Comparator 430 is configured to supply, at its output terminal, a signal S1 representative of the comparison of signal Verr with threshold VTH. In this embodiment, signal S1 is a binary signal having its high or low state indicating whether voltage Verr is greater or not than voltage VTH.

Similarly, comparator 440 comprises one output terminal and two input terminals respectively connected to the output terminal of amplifier 420 and to output terminal 417 of circuit 41o. Comparator 440 is configured to supply, at its output terminal, a signal S2 representative of the comparison of signal Verr with threshold VTL. In this embodiment, signal S2 is a binary signal having its high or low state indicating whether voltage Verr is greater or not than voltage VTL.

Comparator 450 comprises one output terminal and two input terminals connected to respective terminals 49 and 51 of circuit 40. Comparator 450 is configured to supply, at its output terminal, a signal S3 representative of the comparison of voltage VR with reference voltage Vref. In this embodiment, signal S3 is a binary signal having its high or low state indicating whether voltage VR is greater or not than reference voltage Vref.

Comparator 460 comprises one output terminal and two input terminals respectively connected to the output terminal of amplifier 51 of circuit 40 and to the output terminal of amplifier 420. Comparator 460 is configured to supply, at its output terminal, a signal S4 representative of the comparison of voltage VR with voltage Verr. In this embodiment, signal S4 is a binary signal having its high or low state indicating whether voltage VR is greater or not than voltage Verr.

Comparator 465 comprises one output terminal and two input terminals connected to respective terminals 43 and 49 of circuit 40. Comparator 465 is configured to supply, at its output terminal, a signal S5 representative of the comparison of voltage Vout with reference voltage Vref. In this embodiment, signal S5 is a binary signal having its high or low state indicating whether voltage Vout is greater or not than voltage Vref.

Circuit 40 further comprises an asynchronous state machine circuit 470 (ASYNC SM) where the state switching operations are not necessarily synchronized with the clock signal. Block 470 is, for example, powered with voltage Vin an may be implemented, for example, using custom logic, a controller or processing core, or a general purpose controller or processor.

In operation, state machine 470 generates control signals Cmd1, Cmd2, and SR according to the state of signals S0, S1, S2, S3, S4, S5, and clk. Thus, state machine 470 comprises input terminals connected to input terminals 41 and 47 of circuit 40, input terminals connected to the output terminals of comparators 430, 440, 450, 460, and 465, and three output terminals respectively connected to output terminals 53, 55, and 57 of circuit 40.

Figure 3:
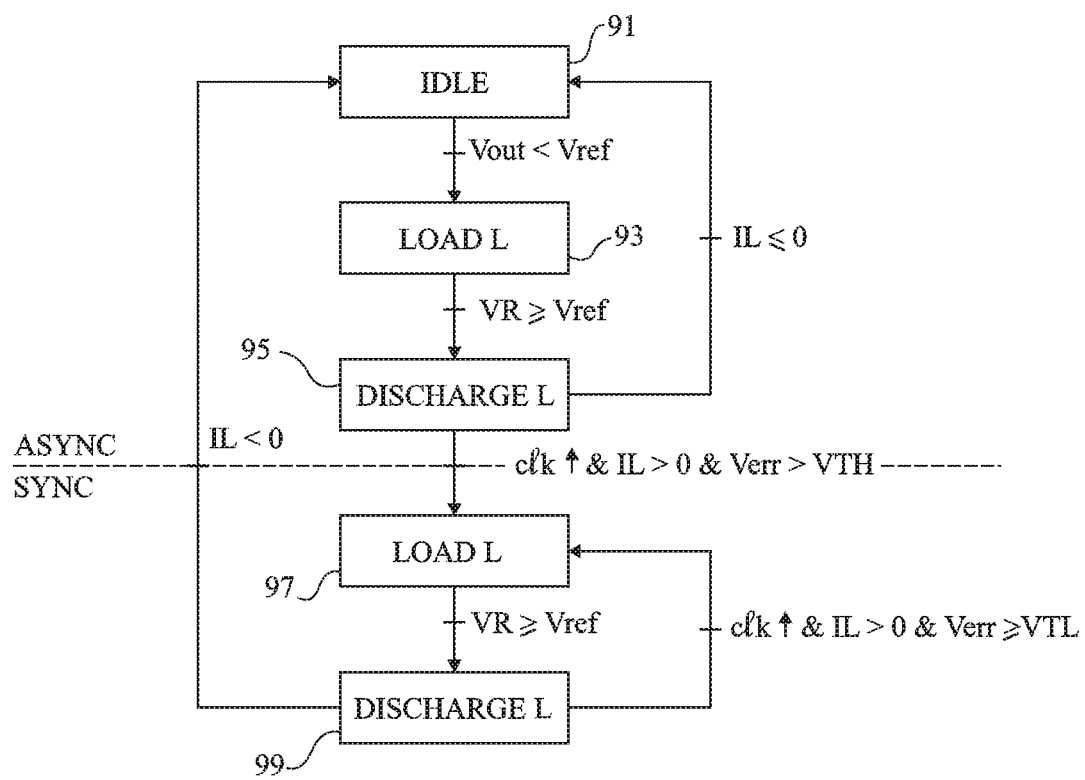
FIG. 3 is a flowchart schematically illustrating an embodiment of a method of controlling the switched-mode power supply of FIG. 1.

FIG. 3 is a flowchart illustrating an embodiment of a method of controlling the switched-mode power supply of FIG. 1, and more particularly a method of controlling switching circuit o0. The control method is, for example, implemented by control circuit 40, such as by asynchronous state machine 470 of circuit 40.

In an idle state 91 (block IDLE), for example, the initial state of the method, no power is present in inductive element 20, switches 13 and 15 are off, and generator 60 is controlled so that no voltage ramp VR is generated. The detection of the fact that output voltage Vout becomes smaller than reference voltage Vref (condition Vout<Vref) causes the switching from state 91 to a state 93 (block LOAD L).

The switching to state 93 causes the beginning of a phase of power storage in inductive element 20 (i.e., charging inductive element 20), where the storage phase is not synchronized with clock signal clk. To achieve this, circuit 40 controls switch 13 to the on state, switch 15 remaining off. Further, circuit 40 causes the beginning of a voltage ramp VR, for example, by asserting control signal SR. The detection of the fact that voltage ramp VR has reached a value greater than or equal to that of voltage Vref (condition VR≥Vref) causes the switching from state 93 to a state 95 (block DISCHARGE L).

The switching to state 95 causes the beginning of a phase of discharge of the power stored in inductive element 20 towards the assembly of load 80 and of capacitive element 30. To achieve this, at state 95, circuit 40 controls switch 13 to the off state and switch 15 to the on state. Further, at the switching to state 95, circuit 40 causes the end of voltage ramp VR (e.g., by deasserting control signal SR).

At step 95, for each rising edge (or falling edge) of signal clk (clk↑), it is verified whether a first transient phenomenon/event (decrease of voltage Vout with respect to voltage Vref) is detected. In some embodiments, the detection of the first transient event is performed by comparing Vout, or a voltage based on Vout (e.g., Verr) with a first threshold, here, threshold VTH. The detection of a first transient event during a rising edge of signal clk causes the switching, during this clock edge, from state 95 to a state 97 (block LOAD L). As long as no first transient event is detected at the rising edges of signal clk, the switched-mode power supply remains at state 95, whereby current IL progressively decreases towards a zero value. The detection that current IL has taken a zero value (condition IL≤0) then causes the switching from state 95 to idle state 91.

More particularly, in this embodiment, a first transient phenomenon is detected if voltage Verr is greater than threshold voltage VTH (Verr>VTH). Thus, the switching from state 95 to state 91 occurs when condition clk↑ & IL>0 & Verr>VTH is verified. Verifying that current IL is positive (IL>0) enables avoidance of a simultaneous switching from state 95 to state 97 and to state 91.

The switching to state 97 causes the beginning of a phase of power storage in inductive element 20, where the storage phase is synchronized with clock signal clk. To achieve this, at state 97, circuit 40 controls switch 13 to the on state and switch 15 to the off state. Further, circuit 40 orders the beginning of a voltage ramp VR. The detection of the fact that voltage ramp VR has reached a value greater than or equal to that of voltage Verr (condition VR≥Verr) causes the switching from state 97 to a state 99 (block DISCHARGE L).

The switching to state 99 causes the beginning of a phase of discharge of the power stored in inductive element 20. Circuit 40 then controls switch 13 to the off state and switch 15 to the on state. Further, circuit 40 orders the end of voltage ramp VR.

At step 99, for each rising edge of signal clk (clk↑), it is verified whether a second transient phenomenon (increase of voltage Vout with respect to voltage Vref) is detected, the detection of such a transient phenomenon being conditioned by a second threshold, here, threshold VTL. The absence of a detection of a second transient phenomenon during a rising edge of signal clk causes the switching, during this edge, from state 99 to state 97, and thus the beginning of a power storage phase synchronized on this edge. As long as a second transient phenomenon is detected at the rising edges of signal clk, it is remained at state 99, whereby current IL progressively decreases to become equal to zero. The detection that current IL has taken a zero value (condition IL≤0) then causes the switching from state 99 to idle state 91.

More particularly, in this embodiment, a second transient phenomenon is detected if voltage Verr is smaller than voltage VTL, the absence of the second transient phenomenon thus being detected if voltage Verr is greater than voltage VTL (Verr≥VTL). Thus, the switching from state 99 to state 97 has occurred if condition clk↑ & IL>0 & Verr≥VTL is verified, the verification of the fact that current IL is positive (IL>0) enabling to avoid a simultaneous switching from state 99 to state 97 and to state 91.

The above-described method thus comprises a control mode ASYNC which is not synchronized with signal clk and comprising states 91, 93, and 95. Control mode ASYNC is similar to a control mode currently called "pulse skipping mode." The method further comprises a control mode SYNC, synchronized with signal clk and comprising states 97 and 99. Control mode SYNC is similar to a synchronous mode of continuous conduction type, that is, a synchronous embodiment where a non-zero current IL permanently flows through inductive element 20. In FIG. 3, the switching from mode SYNC to mode ASYNC and from mode ASYNC to mode SYNC is schematically shown by a dotted line.

As an example, the above-mentioned conditions causing the switching from one state to another are verified by state machine 470 of circuit 40. Condition Vout<Vref is, for example, verified from signal S5. Condition VR≥Vref is for example verified from signal S3. Condition IL≤0 is, for example, verified from signal S0. Condition clk↑ & IL>0 & Verr>VTH is, for example, verified from signals clk, S0, and S1. Condition VR≥Verr is, for example, verified from signal S4. Condition clk↑ & IL>0 & Verr≥VTL is, for example, verified from signals clk, So, and S2.

In an alternative embodiment, circuit 410 comprises an additional input terminal coupled to the output terminal of comparator 465 and has a single output terminal. Circuit 410 is then configured to supply, at its output terminal, threshold VTH when voltage Vout is smaller than voltage Vref and threshold VTL when voltage Vout is smaller than voltage Vref. This enables to suppress one of comparators 430 and 440 and thus to decrease the bulk of the switched-mode power supply.

Figure 4:
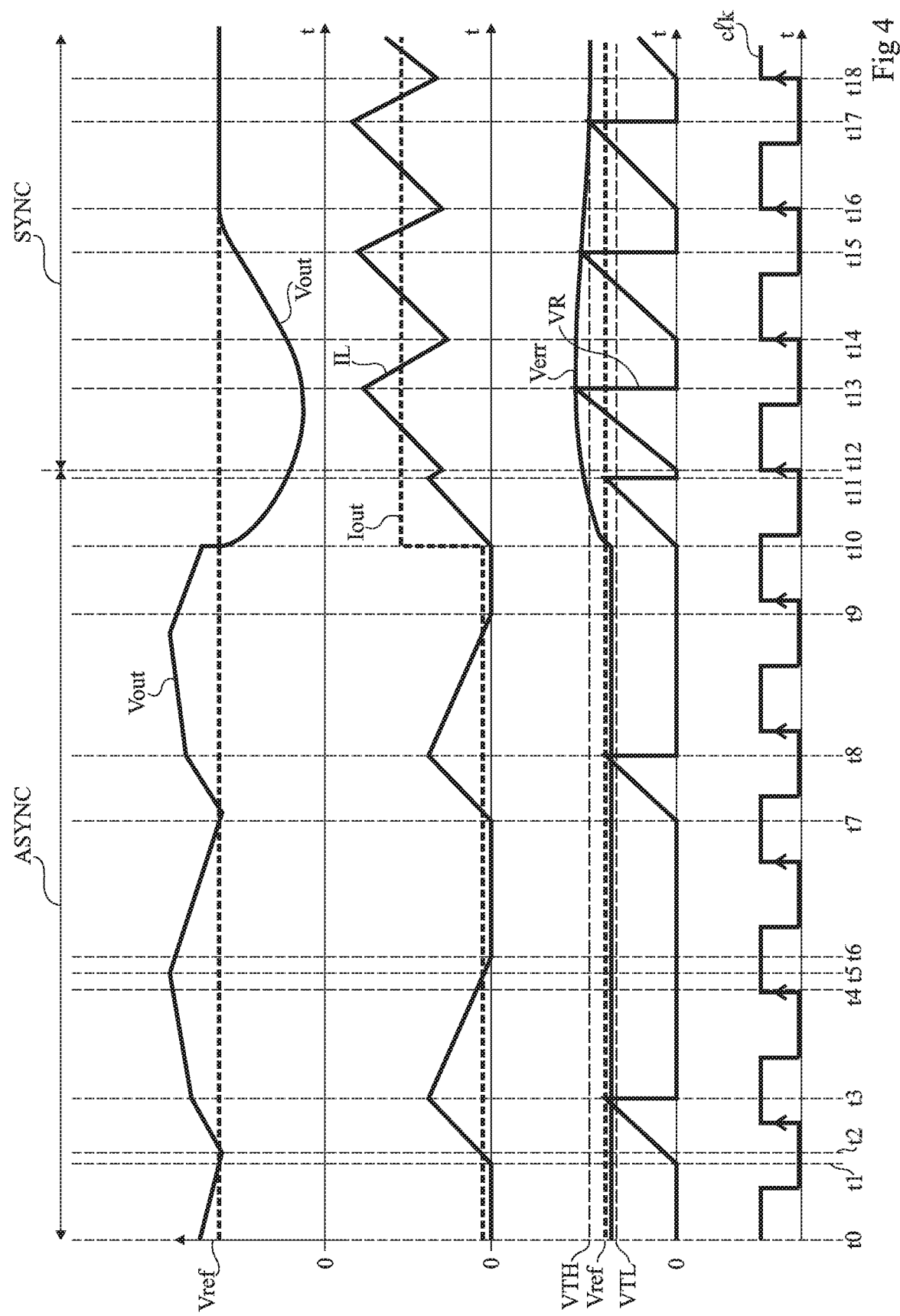
FIG. 4 schematically shows timing diagrams illustrating the implementation of the method of FIG. 3 during an increase of the current drawn by a load.
Figure 5:
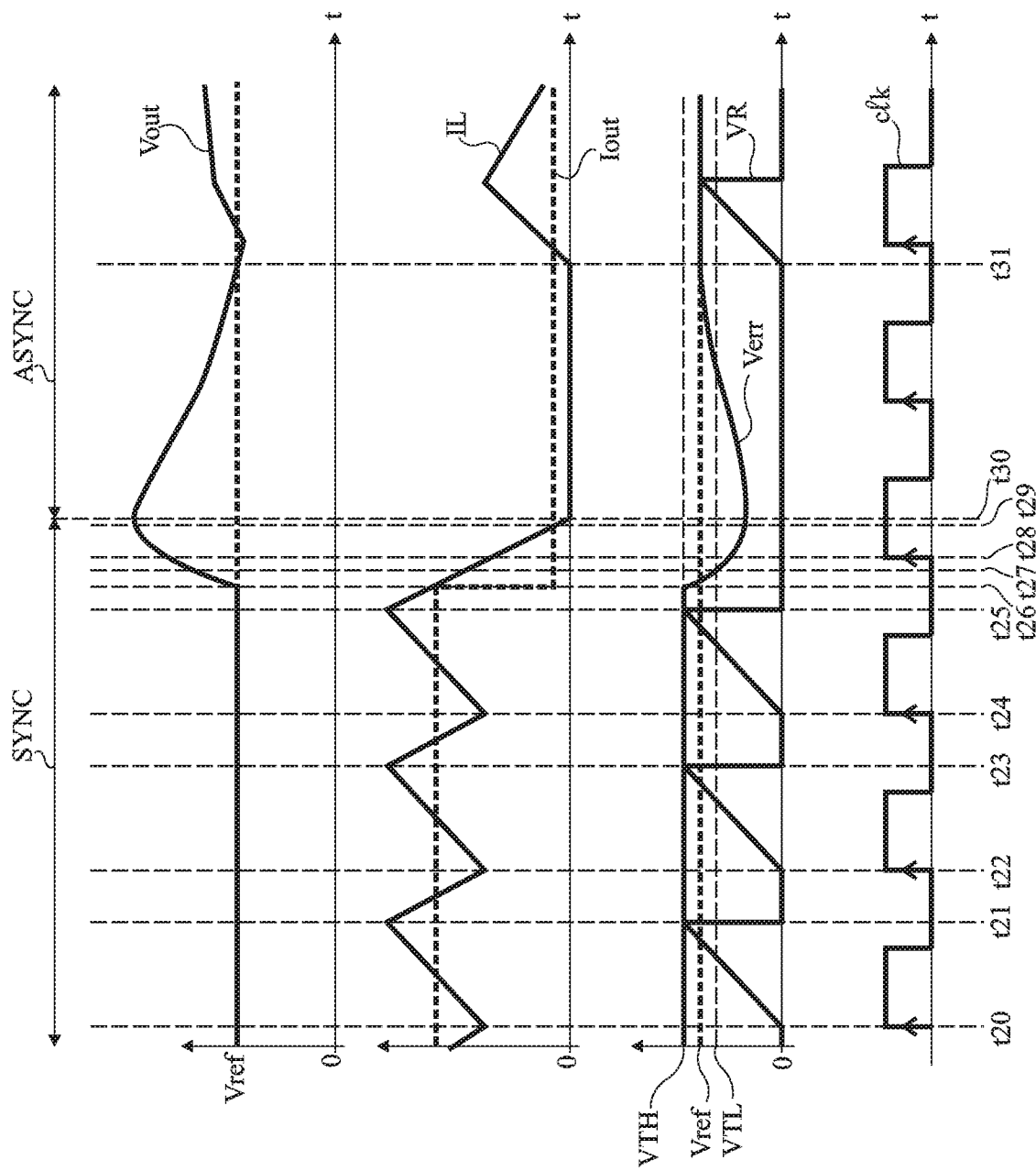
FIG. 5 schematically shows timing diagrams illustrating the implementation of the method of FIG. 3, during a decrease of the current drawn by a load.

Each of FIGS. 4 and 5 shows timing diagrams, drawn schematically and not to scale, illustrating examples of shapes of voltages Vref, Vout, Verr, VR, VTH, and VTL, of currents IL and Iout, and of clock signal clk during the implementation, in the switched-mode power supply of FIG. 1, of the method of FIG. 3. More particularly, FIGS. 4 and 5 illustrate the operation of the switched-mode power supply, respectively during a first transient phenomenon (decrease of voltage Vout with respect to voltage Vref) and during a second transient phenomenon (increase of voltage Vout with respect to voltage Vref).

In FIG. 4, the case where, at a time to, control circuit 40 is at state 91 and voltage Vout across the assembly of load 80 and of capacitive element 20 is such that voltage Verr is between voltages Vref and VTL, is considered as an example. Current IL is equal to zero and smaller than current Iout, whereby voltage Vout progressively decreases.

At a time t1 subsequent to time to, voltage Vout becomes smaller than voltage Vref and circuit 40 then switches to state 93. Thus, a voltage ramp VR starts and current IL progressively increases from time t1. As soon as current IL becomes greater than current Iout (time t2), voltage Vout progressively increases.

At a time t3 subsequent to time t1, voltage VR becomes greater than voltage Vref and circuit 40 then switches to state 95. This causes the end of voltage ramp VR and the progressive decrease of current IL from time t3, the progressive increase of voltage Vout carrying on as long as current IL remains greater than current Iout, here until time t5.

At a time t4 subsequent to time t3 and corresponding to a rising edge of signal elk, circuit 40 is at state 95, and current IL is positive. However, voltage Verr is smaller than threshold voltage VTH, which indicates the absence of a first transient phenomenon (decrease of voltage Vout with respect to voltage Vref). Circuit 40 then remains at state 95, and thus in control mode ASYNC.

From time t5, voltage Vout progressively decreases due to the fact that current IL is smaller than current Iout.

At a time t6 subsequent to times t4 and t5, current IL becomes equal to zero and circuit 40 switches to state 91.

The operation described in relation with times t1, t3, and t6 is repeated at respective successive times t7, t8, and t9.

In control mode ASYNC, current IL is maintained at a zero value between a phase of power discharge (state 95) and a next phase of power storage (state 93), for example, here, between times t6 and t7, which enables to decrease losses in the switched-mode power supply with respect to the case where it would be controlled according to a control mode where current IL would keep on decreasing after having reached a zero value.

At a time t10 subsequent to time t9, current Iout increases, which results in a first transient phenomenon. Voltage Vout becomes almost immediately smaller than voltage Vref, which causes the switching of circuit 40 from state 91 to state 93. A voltage ramp VR starts and current IL progressively increases. Further, the decrease of voltage Vout with respect to voltage Vref causes the increase of voltage Verr.

At a time t11 subsequent to time t10, voltage VR becomes greater than voltage Vref and circuit 40 switches to state 95. This causes the end of voltage ramp VR and the progressive decrease of current IL.

At a time t12 subsequent to time t11 and corresponding to the rising edge of signal elk following time t10, the first transient phenomenon is detected due to the fact that voltage Verr is greater than voltage VTH. Circuit 40 switches from state 95 to state 97, that is, from control mode ASYNC to control mode SYNC. The switching of circuit 40 to state 97 causes the beginning of a voltage ramp VR and the progressive increase of current IL.

In control mode ASYNC, the detection of a decrease of voltage Vout with respect to voltage Vref takes place independently from the edges, here rising, of signal clk. As a result, it is not necessary to wait for a rising edge of the signal to control a non-synchronized phase of power storage in inductive element 20 to compensate for the decrease of voltage Vout. When such a decrease of voltage Vout corresponds to the beginning of a first transient phenomenon, as it here occurs at time t10, the first transient phenomenon is detected during the first rising edge of the next signal clk, here at time t12, which causes the switching from control mode ASYNC to control mode SYNC and, simultaneously, the beginning of a new phase of power storage in inductive element 20. This results in a decrease in the duration of the first transient phenomenon with respect to the case where the power supply would be only controlled synchronously with signal clk.

At a time t13 subsequent to time t12, voltage ramp VR becomes greater than voltage Verr and circuit 40 switches to state 99. This causes the end of voltage ramp VR and the progressive decrease of current IL.

At a time t14 corresponding to the rising edge of signal clk following time t13, current IL is positive and voltage Verr is greater than voltage VTL, which indicates the absence of a second transient phenomenon (increase of voltage Vout with respect to voltage Vref). Circuit 11 switches to state 97 and thus remains in control mode SYNC. The switching to state 97 causes the beginning of a voltage ramp VR and the progressive increase of current IL.

At a time t15 subsequent to time t14, voltage ramp VR becomes greater than voltage Verr and circuit 11 switches to state 99. For each of the next periods of signal clk, as long as voltage Verr remains greater than voltage VTL (absence of second transient phenomenon), circuit 40 switches from state 99 to state 97 during the rising edge of signal clk (times t16 and t18) and from state 99 to 97 when voltage VR reaches voltage Verr (time t17).

In synchronous control mode SYNC (from time t12 in FIG. 4), the comparison of voltage VR with voltage Verr enables to adapt, according to the difference between voltages Vout and Vref, for each period of signal clk, the duration of state 97 with respect to that of state 99, and thus the duration for which current IL is greater than current Iout. This enables, after one or a plurality of periods of signal clk, to take back voltage Vout to a value substantially equal to that of voltage Vref and then to hold it at this value.

In FIG. 5, at a time t20 for example corresponding to time t18 of FIG. 4, the circuit is at state 99 of mode SYNC, voltage Vout is such that voltage Verr is between voltages Vref and VTH. Due to the fact that voltage Verr is greater than voltage VTL (absence of a detection of the second transient phenomenon), the rising edge of signal clk occurring at time t20 causes the switching of circuit 40 from state 99 to 97. Next successive times t21, t22, t23, t24, and t25 correspond to switching operations from state 97 to state 99 for times t21, t23, and t25 and from state 99 to state 97 for times t22 and t24 due to the fact that, at times t22 and t24, voltage Verr is greater than voltage VTL.

At a time t26 subsequent to time t25, current Iout decreases, which results in a second transient phenomenon (increase of voltage Vout with respect to voltage Vref).

At a time t27 subsequent to time t26, the increase of voltage Vout with respect to voltage Vref is such that voltage Verr becomes smaller than threshold voltage VTL.

At a time t28 subsequent to time t27 and corresponding to the rising edge of signal clk following time t26, the second transient phenomenon is detected due to the fact that voltage Verr is smaller than voltage VTL. Thus, circuit 40 does not switch from state 99 to state 97 and remains at state 99, whereby the progressive decrease of current IL started at time t25 carries on, until current IL becomes smaller than current Iout at a time t29, and then becomes zero at a time t30 subsequent to time t29. From time t29, voltage Vout progressively decreases, which enables to compensate for its increase.

At time t30, the detection that current IL has reached a zero value causes the switching from state 99 to state 91, and thus from control mode SYNC to control mode ASYNC. Due to the fact that at time 91, current IL is held at a zero value, thus smaller than that of current Iout, the progressive decrease of voltage Vout carries on and voltage Vout becomes closer to voltage Vref.

At a time t31 subsequent to time t30, voltage Vout becomes smaller than voltage Vref and circuit 40 switches from state 91 to state 93 similarly to what has been previously described for times t1 and t7 of FIG. 4.

At state 99 of mode SYNC and as long as a second transient phenomenon is going on, no rising edge of signal clk causes the switching from state 99 to state 97 and current IL progressively decreases until it becomes equal to zero. In other words, no new power storage phase is implemented as long as a second transient phenomenon is going on. This enables to decrease the duration of the second transient phenomenon with respect to the case of a power supply which is only controlled synchronously, where each rising edge of signal clk would cause the beginning of a new power storage phase. Further, during such a second transient phenomenon, the detection that current IL has reached a zero value causing the switching from control mode SYNC to control mode ASYNC (time t30 in FIG. 5) also results in that the decrease of current IL is immediately followed by a phase where current IL is held at a zero value (between times t30 and t31) until voltage Vout becomes smaller than voltage Vref. This enables to further decrease the duration of the second transient phenomenon.

Figure 6:
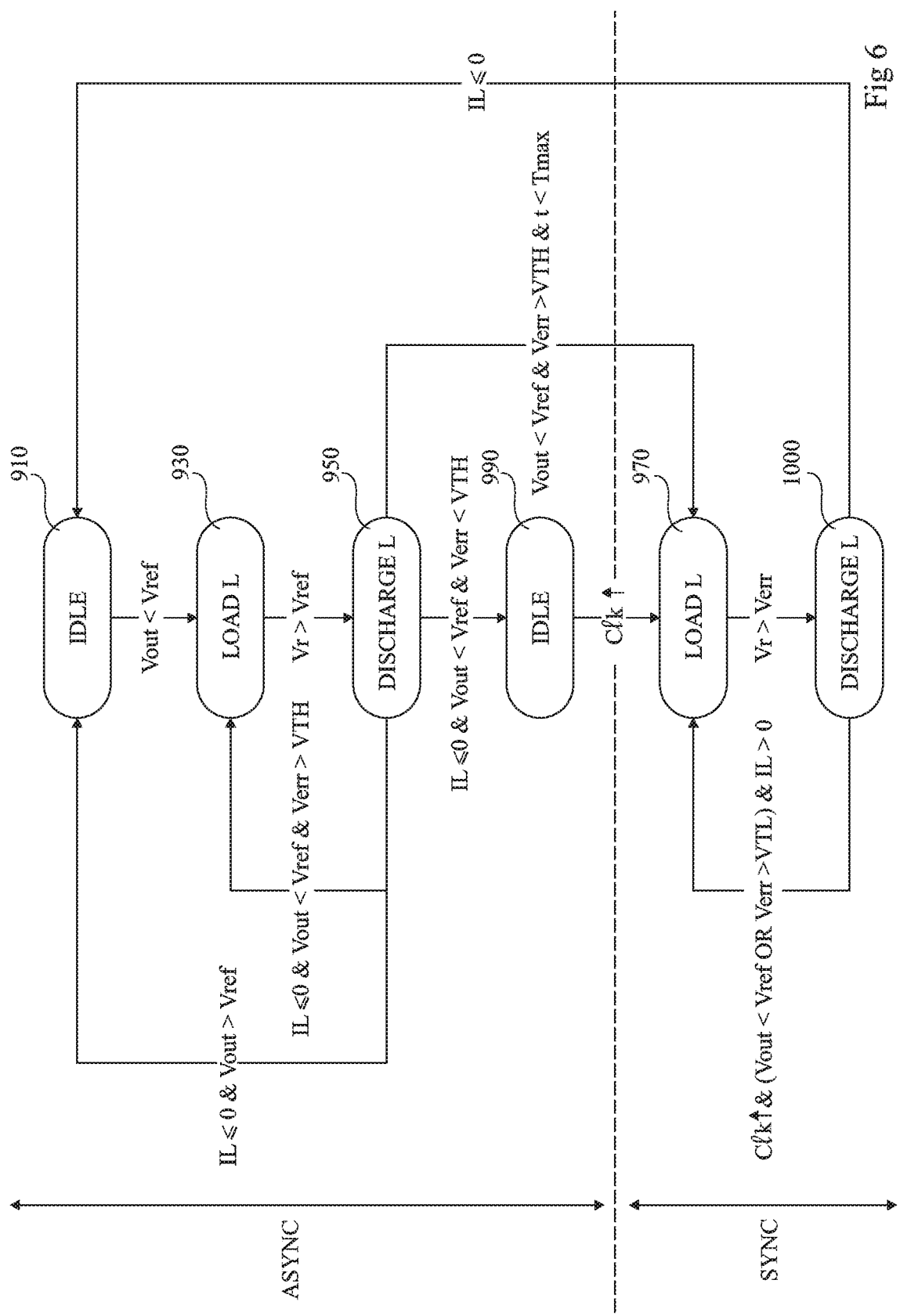
FIG. 6 is a flowchart schematically illustrating an alternative embodiment of the control method of FIG. 3.

FIG. 6 is a flowchart illustrating an alternative embodiment of the control method described in relation with FIG. 3. In this variation, for example, implemented by circuit 40, preferably by asynchronous state machine 470, the detection of a first transient phenomenon (decrease of voltage Vout with respect to voltage Vref) is carried out to distinguish a first abrupt transient phenomenon, corresponding to a fast and significant decrease of voltage Vout, from a first progressive transient phenomenon, corresponding to a slow and/or light decrease of voltage Vout. In this variation, the switching from mode ASYNC to mode SYNC is then performed differently according to whether the first transient phenomenon is abrupt or progressive.

In practice, a transient phenomenon is called abrupt if it results in that voltage Verr reaches values out of the hysteresis defined by signal ΔV, and is called progressive otherwise. As an example, a transient phenomenon is called abrupt if it corresponds to a variation of a voltage Vout by an amplitude of more or less 5% of voltage Vref within a time much shorter than the period of signal clk, for example, smaller than 30% of the period of signal clk, preferably a time in the range from 10 to 30% of the period of signal clk, the transient phenomenon being called progressive otherwise.

In an idle state 910 (block IDLE), for example, the initial state of the method, no power is present in inductive element 20, switches 13 and 15 are off, and generator 60 is controlled so that no voltage ramp VR is generated. The detection of the fact that output voltage Vout becomes smaller than reference voltage Vref (condition Vout<Vref) causes the switching from state 910 to a state 930 (block LOAD L) of power storage in inductive element 20.

The switching to state 930 causes the beginning of a power storage phase and of a voltage ramp VR. The detection of the fact that voltage ramp VR has reached a value greater than that of voltage Vref (condition VR>Vref) causes the switching from state 930 to a state 950 (block DISCHARGE L) of discharge of the power stored in inductive element 20.

The switching to state 950 causes the beginning of a phase of power discharge towards the assembly of load 80 and of capacitive element 30 and the end of voltage ramp VR.

At state 950, during a time period Tmax following the time when it is switched to state 950, it is verified whether a first abrupt transient phenomenon (fast and significant decrease of voltage Vout with respect to voltage Vref) is detected, such a detection being conditioned by a first threshold, here, threshold VTH. If such a transient phenomenon is detected during period Tmax, it is switched to a state 970 (block LOAD L) of power storage in inductive element 20. Period Tmax is short as compared with the time necessary to discharge all the power stored in inductive element 20. As an example, period Tmax is shorter than 10%, preferably than 5%, of the time for which all the power stored in inductive element 20 is discharged during a power storage phase occurring in the absence of a transient phenomenon. Period Tmax is for example in the range from 30 to 35 ns. The verification that time t which has elapsed since the switching to state 950 is shorter than period Tmax (condition t<Tmax) may be implemented in different ways by those skilled in the art, for example, by using a delay line.

The fact that the switching from state 950 to state 970 can only be performed during period Tmax after the switching to state 950 enables to ensure that it is switched to state 970 with a non-zero current IL in inductive element 20, which results in a decrease in the duration of the first transient phenomenon with respect to the case where the switching from state 970 would be performed while current IL is equal to zero.

At state 950, if time period Tmax elapses without detecting a first abrupt transient phenomenon, the switched-mode power supply remains at state 950 until current IL becomes equal to zero. At the time when current IL becomes equal to zero (condition IL≤0), it is verified whether a first phenomenon (abrupt or progressive) is detected or not.

At state 950, if a first abrupt transient phenomenon is detected when current IL becomes equal to zero, this means that the first abrupt transient phenomenon has occurred too late to be detected during period Tmax. It is then switched to power storage state 930. This enables to ensure that at the beginning of the next state 950, in other words during a period Tmax, it is switched to state 970 with a non-zero current IL in inductive element 20.

At state 950, if a first progressive transient phenomenon is detected when current IL becomes zero, it is switched to an idle state 990 (IDLE). The detection of a first progressive transient phenomenon is conditioned by first threshold VTH and by reference voltage Vref. The switching to state 990 causes the end of voltage ramp VR and the turning off of switches 13 and 15. At state 990, as soon as a rising edge of signal clk is detected, it is switched to state 970 synchronously with the clock signal.

At state 950, if no first transient phenomenon is detected when current IL becomes zero, it is switched to idle state 910.

In the embodiment illustrated in FIG. 6, a first abrupt transient phenomenon is detected if voltage Verr is greater than threshold voltage VTH (Verr>VTH) and, optionally, if voltage Vout is further smaller than voltage Vref (Vout<Vref). Such an optional condition for example enables to take into account possible delays introduced by the comparators and the amplifier of circuit 40. Thus, the switching from state 950 to state 970 occurs if condition Vout<Vref & Verr>VTH & t<Tmax is verified, and the switching from state 950 to state 930 occurs if condition IL≤0 & Vout<Vref & Verr>VTH is verified. A first progressive transient phenomenon is for example detected if voltage Vout is smaller than voltage Vref but voltage Verr is smaller than voltage VTH, in other words, if the first detected transient phenomenon is not abrupt. Thus, the switching from state 950 to state 990 occurs if condition IL≤0 & Vout<Vref & Verr<VTH is verified. No first transient phenomenon is detected if voltage Vout remains greater than voltage Vref, the switching from state 950 to state 910 then occurring if condition IL≤0 & Vout>Vref is verified.

The switching to state 970 causes the beginning of a phase of power storage in inductive element 20 and the beginning of a voltage ramp VR. The detection of the fact that voltage VR becomes greater than voltage Verr causes the switching from state 970 to a state 1000 (DISCHARGE L) of discharge of the power stored in inductive element 20.

The switching to state 1000 causes the beginning of a phase of power discharge and the end of voltage ramp VR.

At step 1000, for each rising edge of signal clk (clk↑), it is verified whether a second transient phenomenon (increase of voltage Vout with respect to voltage Vref) is detected, such a detection being conditioned by a second threshold, here, threshold VTL. The absence of a detection of a second transient phenomenon during a rising edge of signal clk causes the switching, during this edge, from state 1000 to state 970, and thus the beginning of a power storage phase synchronized on this edge. As long as a second transient phenomenon is detected on rising edges of signal clk, it is remained at state 1000, whereby current IL progressively decreases to become equal to zero. The detection that current IL has taken a zero value (condition IL≤0) then causes the switching from state 1000 to idle state 910.

In the embodiment illustrated in FIG. 6, a second abrupt transient phenomenon is detected if voltage Verr is smaller than threshold voltage VTL and, optionally, if voltage Vout is further greater than voltage Vref. In other words, no second transient phenomenon is detected if voltage Verr is greater than voltage VTL, or optionally, if voltage Vout is smaller than voltage Vref (condition Verr>VTL OR Vout<Vref). Thus, in this example, the switching from state 1000 to state 970 occurs if condition clk↑ & (Verr>VTL OR Vout<Vref) & IL>0 is verified, the verification of the fact that current IL is positive (condition IL>0) enabling to avoid a simultaneous switching from state 1000 to state 970 and to state 91.

It should be noted that in the alternative embodiment described in relation with FIG. 6, similarly to the embodiment described in relation with FIG. 3, all the storage phases synchronized with clock signal clk belong to the synchronous control mode comprising state 970 and 1000, asynchronous control mode ASYNC (states 910, 930, 950, and 990) only comprising storage phases which are not synchronized with clock signal clk. However, conversely to the embodiment described in relation with FIG. 3, in the alternative embodiment described in relation with FIG. 6, control mode SYNC may comprise a non-synchronized storage phase having its beginning corresponding to the switching from state 950 to state 970.

In the above described embodiments, the power storage phases in the inductive element 20, occurring in the synchronous mode SYNC or in the asynchronous mode ASYNC, result from switching, and more particularly from switching of the switching circuit 10 having its output terminal 11 connected to a terminal of the inductive element 20. Thus, in synchronous and asynchronous control modes, the power supply operates in a switched manner.

In the above-described embodiments, it can be observed that the switched-mode power supply is controlled according to mode ASYNC for lighter currents than when it is controlled according to mode SYNC. Further, the switching noise of a switched-mode power supply decreases with the current drawn by its load. Thus, the switching noise of the power supply controlled according to mode ASYNC does not or only slightly disturbs the operation of other circuits. When the switched-mode power supply is controlled according to mode SYNC, it is preferably provided for each switching synchronized on signal clk occurring in the switched-mode power supply to be performed simultaneously to a switching occurring in a synchronous circuit likely to be disturbed by the switching noise of the switched-mode power supply. In other words, it is provided for each edge of signal clk causing a switching in the switched-mode power supply to occur at the same time as an edge of a clock signal causing a switching in the synchronous circuit not to be disturbed. The switching noise of the power supply is then confounded with that of the circuit not to be disturbed, whereby the noise of the power supply does not disturb or only slightly disturbs the operation of this circuit. As an example, the circuit not to be disturbed is a synchronous circuit, for example, a circuit formed inside and on top of the same semiconductor substrate as the switched-mode power supply and/or a circuit of load 80. As an example, the synchronous circuit is an analog-to-digital (ADC) or digital-to-analog (DAC) converter. Signal clk of the power supply is, for example, the clock signal of the synchronous circuit not to be disturbed.

Further, the switching frequency during mode ASYNC is, in practice, lower than that of the switching during mode SYNC. The provision of control mode ASYNC thus enables to decrease losses in the switched-mode power supply with respect to the case where it would be only controlled synchronously with signal clk.

The fact that the power supply operates in synchronous mode SYNC for currents greater than those of the asynchronous mode ASYNC results from, among others, the fact that the switching from the mode ASYNC to the mode SYNC is done when the output voltage Vout decreases relative to the reference voltage Vref. In other words, this switching is done when the current drawn by the load rises from a low value to a high value. Furthermore, the switching from the mode SYNC to the mode ASYNC is done when the output voltage Vout rises relative to the reference voltage Vref, that is to say when the current drawn by the load decreases from a high value to a low value.

In the above-described embodiments, it should be understood that the selection of thresholds VTH and VTL, as well as of the gain of amplifier 420, conditions the minimum amplitude for a decrease or an increase of voltage Vout with respect to voltage Vref to be detected as a transient phenomenon. Preferably, voltage ΔV, and thus thresholds VTH and VTL, are proportional to voltage Vin, whereby the detection of a transient phenomenon is also proportional to voltage Vin. As an example, generator 60 of voltage ramp VR comprises a circuit capable of supplying such a voltage ΔV.

In the above-described embodiments, the detection of transient phenomena is performed by comparing voltage Verr with thresholds VTH and VTL. It can be provided for this detection to be performed by directly comparing output voltage Vout with thresholds VTH and VTL. However, in the case where amplifier 420 is implemented so that the amplitude of a difference between voltages Verr and Vref is greater than that of a corresponding difference between voltages Vout and Vref, the comparison of voltage Verr rather than of voltage Vout with thresholds VTH and VTL enables to more accurately detect transient phenomena.

The implementation of amplifier 420 and of the comparators has not been detailed, it being within the abilities of those skilled in the art to form these elements, for example, with operational amplifiers possibly provided with feedback loops, based on the above description of the operation of these elements.

It will also be within the abilities of those skilled in the art to design the circuit of asynchronous state machine 470 based on the above description of the operation thereof.

In a preferred embodiment of the circuits described herein above in relation with FIGS. 1 and 2, term coupled means directly connected, as shown in the corresponding drawings.

Specific embodiments have been described. Various alterations, modifications, and improvements will occur to those skilled in the art. In particular, it will be within the abilities of those skilled in the art to adapt the method and the switched-mode power supply described herein above to the case where voltage Verr increases or decreases when voltage Vout, respectively, increases or decreases, conversely to what has been described herein above where voltage Verr decreases or increases when voltage Vout, respectively, increases or decreases.

The above-described embodiment may be adapted to switched-mode power supplies different from that shown in FIG. 1, for example, to a switched-mode power supply provided to supply an output voltage having a value greater than that of its power supply voltage.

Although a switched-mode power supply comprising a capacitive element 30 has been described, in alternative embodiments, this capacitive element does not belong to the switched-mode power supply but corresponds to the input capacitance of load 80.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of controlling a switched-mode power supply, the method comprising:
    switching a switching circuit of the switched-mode power supply in a synchronous mode by turning on and off switches of the switching circuit in synchrony with a clock signal, wherein the switching circuit is coupled to an inductive element, and wherein the synchronous mode comprises a charging phase and a discharging phase;
    charging the inductive element during the charging phase of the synchronous mode;
    discharging the inductive element during the discharging phase of the synchronous mode;
    switching the switching circuit in an asynchronous mode by turning on and off the switches of the switching circuit without being synchronized with the clock signal, wherein the asynchronous mode comprises a charging phase and a discharging phase;
    charging the inductive element during the charging phase of the asynchronous mode;
    discharging the inductive element during the discharging phase of the asynchronous mode;
    detecting a transient event; and
    transitioning between the asynchronous mode and the synchronous mode in response to the detected transient event, wherein the transient event comprises a decrease of an output voltage of the switched-mode power supply with respect to a reference voltage, and wherein transitioning from the asynchronous mode to the synchronous mode is caused by the decrease of the output voltage with respect to the reference voltage.

2. The method of controlling a switched-mode power supply of claim 1, wherein the transient event is based on a signal representative of a current flowing through the inductive element.

3. The method of controlling a switched-mode power supply of claim 1, the method further comprising detecting the decrease of the output voltage by comparing an error signal representative of a difference between the output voltage and the reference voltage with a first threshold.

4. The method of controlling a switched-mode power supply of claim 3, wherein detecting the decrease of the output voltage comprises detecting the decrease of the output voltage each time the clock signal transitions from a first state to a second state during the discharging phase of the asynchronous mode.

5. The method of controlling a switched-mode power supply of claim 3, wherein detecting the decrease of the output voltage comprises detecting the decrease of the output voltage during the discharging phase of the asynchronous mode.

6. The method of controlling a switched-mode power supply of claim 3, wherein transitioning from the asynchronous mode to the synchronous mode comprises transitioning from the discharging phase of the asynchronous mode to the charging phase of the synchronous mode when the error signal is higher than the first threshold.

7. The method of controlling a switched-mode power supply of claim 6, wherein transitioning from the discharging phase of the asynchronous mode to the charging phase of the synchronous mode comprises transitioning from the discharging phase of the asynchronous mode to the charging phase of the synchronous mode when the clock signal transitions from a first state to a second state.

8. The method of controlling a switched-mode power supply of claim 3, wherein comparing the error signal with the first threshold comprises using a proportional-integral-derivative function.

9. The method of controlling a switched-mode power supply of claim 1, wherein the asynchronous mode further comprises an idle phase, and wherein the switching circuit is not switching during the idle phase of the asynchronous mode.

10. A method of controlling a switched-mode power supply, the method comprising:
   switching a switching circuit of the switched-mode power supply in a synchronous mode by turning on and off switches of the switching circuit in synchrony with a clock signal, wherein the switching circuit is coupled to an inductive element, and wherein the synchronous mode comprises a charging phase and a discharging phase;
   charging the inductive element during the charging phase of the synchronous mode;
   discharging the inductive element during the discharging phase of the synchronous mode;
   switching the switching circuit in an asynchronous mode by turning on and off the switches of the switching circuit without being synchronized with the clock signal, wherein the asynchronous mode comprises a charging phase and a discharging phase;
   charging the inductive element during the charging phase of the asynchronous mode;
   discharging the inductive element during the discharging phase of the asynchronous mode;
   detecting a transient event; and
   transitioning between the asynchronous mode and the synchronous mode in response to the detected transient event, wherein the transient event comprises an increase of an output voltage of the switched-mode power supply with respect to a reference voltage, and wherein transitioning from the synchronous mode to the asynchronous mode is caused by the increase of the output voltage with respect to the reference voltage.

11. The method of controlling a switched-mode power supply of claim 10, wherein detecting the increase of the output voltage comprises detecting the increase of the output voltage during the discharging phase of the synchronous mode.

12. The method of controlling a switched-mode power supply of claim 10, the method further comprising detecting the increase of the output voltage by comparing an error signal representative of a difference between the output voltage and the reference voltage with a second threshold.

13. The method of controlling a switched-mode power supply of claim 12, wherein comparing the error signal with the second threshold comprises using a proportional-integral-derivative function.

14. The method of controlling a switched-mode power supply of claim 12, wherein the transient event further comprises a decrease of an output voltage of the switched-mode power supply with respect to the reference voltage, and wherein transitioning from the asynchronous mode to the synchronous mode is caused by the decrease of the output voltage with respect to the reference voltage, the method further comprising detecting the decrease of the output voltage by comparing the error signal with a first threshold, wherein a difference between the first threshold and the reference voltage is substantially equal to a difference between the second threshold and the reference voltage.

15. A method of controlling a switched-mode power supply, the method comprising:
   switching a switching circuit of the switched-mode power supply in a synchronous mode by turning on and off switches of the switching circuit in synchrony with a clock signal, wherein the switching circuit is coupled to an inductive element, and wherein the synchronous mode comprises a charging phase and a discharging phase;
   charging the inductive element during the charging phase of the synchronous mode;
   discharging the inductive element during the discharging phase of the synchronous mode;
   switching the switching circuit in an asynchronous mode by turning on and off the switches of the switching circuit without being synchronized with the clock signal, wherein the asynchronous mode comprises a charging phase, an idle phase, and a discharging phase, and wherein the switching circuit is not switching during the idle phase of the asynchronous mode;
   charging the inductive element during the charging phase of the asynchronous mode;
   discharging the inductive element during the discharging phase of the asynchronous mode; and
   generating a ramp signal, wherein the ramp signal increases during the charging phase of the asynchronous mode, wherein the ramp signal does not increase during the discharging phase of the asynchronous mode, and wherein the ramp signal does not increase during the idle phase of the asynchronous mode.

16. A method of controlling a switched-mode power supply, the method comprising:
   switching a switching circuit of the switched-mode power supply in a synchronous mode by turning on and off switches of the switching circuit in synchrony with a clock signal, wherein the switching circuit is coupled to an inductive element, and wherein the synchronous mode comprises a charging phase and a discharging phase;
   charging the inductive element during the charging phase of the synchronous mode;
   discharging the inductive element during the discharging phase of the synchronous mode;
   switching the switching circuit in an asynchronous mode by turning on and off the switches of the switching circuit without being synchronized with the clock signal, wherein the asynchronous mode comprises a charging phase and a discharging phase;
   charging the inductive element during the charging phase of the asynchronous mode;
   discharging the inductive element during the discharging phase of the asynchronous mode; and
   generating a ramp signal, wherein the ramp signal starts increasing each time the clock signal transitions from a first state to a second state during the charging phase of the synchronous mode, and wherein the ramp signal decreases when the ramp signal becomes higher than an error signal representative of a difference between an output voltage of the switched-mode power supply and a reference voltage during the discharging phase of the synchronous mode.

17. A switched-mode power supply comprising:
   a switching circuit comprising a first switch configured to be coupled to an inductive element; and
   a control circuit configured to:
      switch the switching circuit in a synchronous mode by turning on and off the first switch in synchrony with a clock signal, wherein the synchronous mode comprises a charging phase and a discharging phase;
      charge the inductive element during the charging phase of the synchronous mode;
      discharge the inductive element during the discharging phase of the synchronous mode;
      switch the switching circuit in an asynchronous mode by turning on and off the first switch without being synchronized with the clock signal, wherein the asynchronous mode comprises a charging phase and a discharging phase;
      charge the inductive element during the charging phase of the asynchronous mode;
      discharge the inductive element during the discharging phase of the asynchronous mode;
      detect a decrease of an output voltage of the switched-mode power supply with respect to a reference voltage; and
      transition from the asynchronous mode to the synchronous mode in response to the detected decrease of the output voltage with respect to the reference voltage.

18. The switched-mode power supply of claim 17, further comprising the inductive element.

19. The switched-mode power supply of claim 17, wherein the switched-mode power supply is a buck converter.

20. The switched-mode power supply of claim 17, wherein the control circuit is further configured to:
   detect an increase of the output voltage of the switched-mode power supply with respect to the reference voltage; and
   transition from the synchronous mode to the asynchronous mode in response to the detected increase of the output voltage of the switched-mode power supply with respect to the reference voltage.

21. The switched-mode power supply of claim 17, wherein the control circuit is configured to detect the decrease of the output voltage each time the clock signal transitions from a first state to a second state during the discharging phase of the asynchronous mode.

22. A method of controlling a switched-mode power supply, the method comprising:
   begin charging an inductive element of a switched-mode power supply during a charging phase of an asynchronous mode when an output voltage of the switched-mode power supply becomes lower than a reference voltage while ignoring a clock signal;
   begin increasing a ramp voltage when the output voltage becomes lower than the reference voltage during the charging phase of the asynchronous mode while ignoring the clock signal;
   begin discharging the inductive element during a discharge phase of the asynchronous mode when the ramp voltage becomes equal or higher than the reference voltage while ignoring the clock signal;
   detecting a decrease of the output voltage by comparing an error signal representative of a difference between the output voltage and the reference voltage with a first threshold during the discharge phase of the asynchronous mode;
   when the decrease of the output voltage is detected during the discharge phase of the asynchronous mode, begin charging the inductive element when the clock signal transitions from a first state to a second state, and begin increasing the ramp voltage during a charging phase of a synchronous mode; and
   begin discharging the inductive element during a discharge phase of the synchronous mode when the ramp voltage becomes equal or higher than the reference voltage.

* * * * *